S. B. RUMERY.

Improvement in Blinders for Horses.

No. 131,029.   Patented Sep. 3, 1872.

Witnesses.    Inventor.
John Moulruth    Solomon B. Rumery
P. D. Smith

UNITED STATES PATENT OFFICE.

SOLOMON B. RUMERY, OF PLAINWELL, MICHIGAN.

IMPROVEMENT IN BLINDERS FOR HORSES.

Specification forming part of Letters Patent No. 131,029, dated September 3, 1872.

Figure 1:
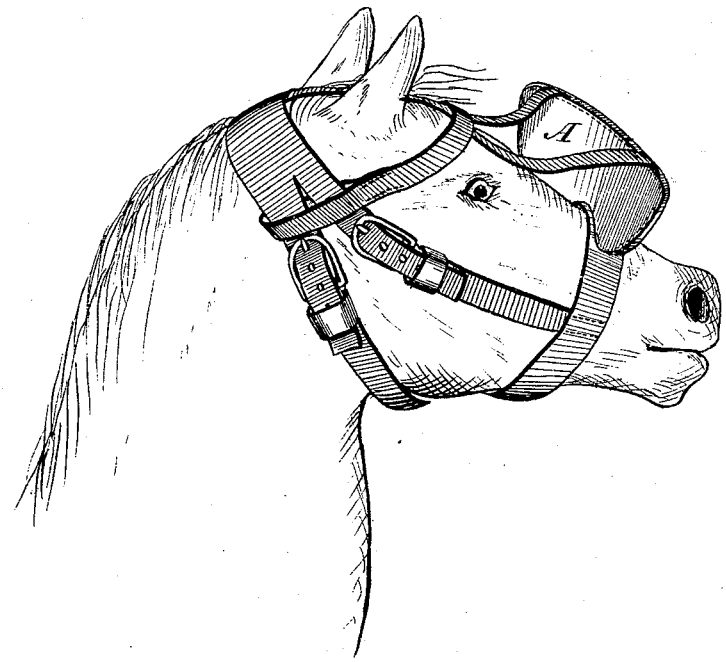
Figure 2:
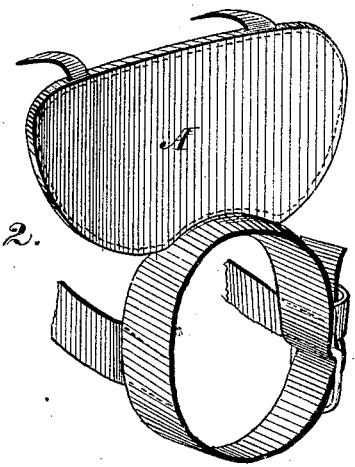

I, SOLOMON B. RUMERY, of Plainwell, Allegan county, State of Michigan, have invented certain Improvements in Blinds to Prevent Horses from Jumping Fences, of which the following is a specification:

Figure 1 is a side view of a blind as used on the horse, embodying my invention. Fig. 2 is a view of the form or shape of the blind embodying my invention.

I construct and attach the blind as follows, to wit: I use a headstall similar to the headstall of an ordinary buckle-halter, with this addition; I use two winker-straps which are attached to the headstall at the top between the ears of the horse. Said winker-straps are for the purpose of supporting the blind in the desired position.

A is a blind of suitable size, from twelve to eighteen inches in length, and from four to eight inches in width, attached to the noseband of the headstall by stitching it firmly to the top edge of said band. Said blind is composed of a sheet-iron plate of suitable size and thickness and covered with common harness leather on both sides. The object of the sheet-iron plate is to make the blind stiff, so that when the winker-straps are attached to the outer edge of said blind it will stand horizontally, or any other position desired. The buckles at the side of the headstall are for the purpose of regulating the distance of the blind from the eyes of the horse.

The object of my invention is to prevent the horse from seeing the ground near his feet on the opposite side of the fence, when the horse approaches the fence with his head elevated for the purpose of jumping. The blind hides the entire view of the fence and ground in front; therefore he becomes intimidated and afraid to make the leap, because he cannot see where to alight.

What I claim as my invention, and desire to secure by Letters Patent, is—

The blind A, substantially as and for the purposes hereinbefore set forth.

SOLOMON B. RUMERY.

Witnesses:
JOHN MONTEITH,
J. D. SMITH.